United States Patent [19]
Haussels

[11] 3,938,864
[45] Feb. 17, 1976

[54] JOURNAL ROLLING BEARING
[75] Inventor: Berthold Haussels, Wermelskirchen, Germany
[73] Assignee: Acousa Saxon S.A., Saxon, Switzerland
[22] Filed: Nov. 26, 1973
[21] Appl. No.: 418,999

[30] Foreign Application Priority Data
Nov. 30, 1972 Germany............................ 2258577
Oct. 5, 1973 Germany............................ 2344661

[52] U.S. Cl. ............................................. 308/187.2
[51] Int. Cl.[2] ............................................ F16C 1/24
[58] Field of Search............. 308/187.1, 187.2, 36.1, 308/187

[56] References Cited
UNITED STATES PATENTS
3,259,442  7/1966  Boghosian....................... 308/187.1
3,727,738  4/1973  Briar............................... 308/187.1
3,743,068  7/1973  Westervelt et al.............. 308/187.1

Primary Examiner—Philip Goodman
Assistant Examiner—Richard A. Bertsch
Attorney, Agent, or Firm—Karl F. Ross; Herbert Dubno

[57] ABSTRACT

A journal bearing for supporting the hubs of wheels and rollers comprises at least two axially spaced rows of rolling elements between an outer bearing ring and an inner bearing member. The inner bearing member has connecting means at each end to enable the bearing to be fitted to a wheel fork. The inner bearing member also carries sealing means on its axial end portions to protect the rolling elements. These axial end portions may be of reduced external diameter and can project axially beyond the outer bearing ring.

18 Claims, 6 Drawing Figures

JOURNAL ROLLING BEARING

FIELD OF THE INVENTION

This invention relates to a journal bearing, in particular for supporting of hubs of wheels, rollers and the like, comprising at least two rows of rolling elements which are arranged, spaced from one another axially of the hub, between an outer bearing ring supporting the wheel hub and an inner bearing member.

DESCRIPTION OF THE PRIOR ART

Such journal bearings permit the use of only one structural element for supporting large loads. Known rolling bearings of this kind are connected with the shaft or axle, i.e. the inner bearing ring is secured by shrinking or by a groove and tongue joint. The axle or shaft is supported for example on load-bearing housing walls or other support members, or it is loaded and supports itself by means of the outer bearing ring on a wheel or the like.

SUMMARY OF THE INVENTION

It is an object of the present invention to provide a rolling bearing of the kind first mentioned above in which the inner bearing member can be secured more easily than with known methods of securement and which is formed at the same time as a structural unit equipped with the necessary bearing.

In accordance with the invention there is provided a rolling bearing comprising an inner bearing member, an outer bearing ring encircling said inner bearing member and arranged to provide central support for a wheel or the like, at least two rows of rolling elements between said bearing member and bearing ring with the rows spaced from one another axially of the bearing ring, the inner bearing member being provided with connecting means for the securement of the bearing to external means, and sealing means protecting the rolling elements against contamination and carried on axial end portions of the inner bearing member.

The rolling bearing so formed is particularly suitable for supporting hubs of wheels or rollers, in which the load is taken up over a comparatively wide hub flange. Moreover, the outer bearing ring which is common to the rows of rolling elements can perform the mechanical connection of two wheel discs of a double-disc wheel so that they are not coupled directly together in the region of the hub. The discs and the rolling bearing, prefabricated as a structural unit, can be fitted together in a simple manner by pressing together the wheel discs and the rolling bearing or its outer bearing ring, particularly if the wheel discs are made of a plastic material.

It is important for the invention that the inner bearing member has said connecting means by means of which it can be fitted into wheel forks for example to hold the wheel and can be secured. With known wheels for vehicles, apparatus and the like, instead of this, and as a result of the use of two individual rolling bearings, a support sleeve must be fitted to the two individual rolling bearings, with their inner rings held spaced by spacer rings and secured together by a screw bolt penetrating through all the sleeves and rings. In addition, in these known bearings there is the problem of fitting seals to the bearing. The present invention avoids this problem since the inner bearing member carries seals, preferably at each end, for protection of the rolling elements against dirt, the seals being arranged on unitary axial end portions of the inner bearing member. The rolling bearing thus offers the possibility of substantially simplifying the internal construction of the bearing and its attachment to a supporting part, e.g. a wheel fork.

In a preferred embodiment, the inner bearing member is a solid member with threaded pins projecting from each axial end to be receivable in the prongs of a wheel fork so that securing nuts can then be screwed on to the pins. Alternatively, the inner bearing member may be provided with threaded bores in each end, into which pins penetrating through and supporting the fork prongs can be screwed. The inner bearing member is preferably made from solid stock by automatically-operating machine tools.

With rolling bearings of small internal dimensions, it is difficult to make long bores and to provide these with threads. The rolling bearing with threaded projecting pins is thus of particular importance, especially as a hole weakens the supporting cross-section of the inner bearing member to too great an extent with large loads.

The inner bearing member may however alternatively be a sleeve with internal threading or with a reducing sleeve with internal threading secured therein. The reducing sleeve, if fitted, may be secured against axial displacement relative to the bearing sleeve by radial projections therebetween. The bearing sleeve and reducing sleeve may be made of solid stock if production of tubular material is too expensive or is too time-consuming, particularly with small diameters.

Preferably, the axial end portions of the inner bearing member carrying the sealing means are of reduced external diameter and project axially beyond the outer bearing ring. The seals are prevented from axial movement towards the rolling elements by the reduction of the external diameter.

Each sealing means preferably defines a labyrinth annular passage arranged to receive a radially inwardly projecting annular tongue of a wheel hub portion, and includes a sealing lip arranged to rest sealingly against the outer bearing ring and forming the inner limit of the labyrinth passage. While the sealing lip provides a fine seal, the labyrinth passage prevents damage of the sealing lip by coarse or granular impurities. If each sealing means includes an axially outer annular portion formed as a lip arranged to rest sealingly against said annular tongue of the wheel hub portion, then the reliability of the seal is increased.

In one construction of the invention, hub flanges of wheel discs of a double-disc wheel or of a spoked wheel are secured to the outer bearing ring by press-fitting or by welding.

According to a further arrangement, the outer bearing ring carries two flanges to which a wheel hub or a wheel disc may be rigidly connected. The wheel hub or the wheel disc can be arranged between the two flanges on the outer bearing ring so that they are secured to the bearing ring safely and durably according to the structural requirements.

In a preferred arrangement, at least one flange is screwed on to the outer bearing ring and the wheel hub or wheel disc is clamped rigidly between the two flanges. The arrangement of the hub or the wheel disc between the two flanges effects not only its securement in the axial directions, but also has the effect that the hub or the wheel disc cannot move in a peripheral direction relative to the outer bearing ring. Thus, in many cases, the previously necessary press-fitting or clamping of the hub or of the wheel disc on the outer bearing ring can be dispensed with. This is the case in particular if at least one flange is connected to the hub or wheel disc in a manner preventing relative rotation therebetween. For example, the or each flange may have radial ribs which engage in corresponding grooves in the hub or the wheel disc.

It should be understood that the flanges secured to the outer bearing ring can be fixed in some other manner than by screwing, for example by caulking or by turning over the edges. However, a screw connection of the two flanges gives a simple and above all a readily repeatable setting of the mounting of the hub or of the wheel disc on the outer bearing ring.

In one preferred embodiment of the invention, the outer bearing ring extends in the axial direction at each end beyond the rolling elements and carries on the extension portiosn fastening means for the flanges. Thus, not only is the space on the outer bearing ring which is necessary for screwing on the flanges created, but an annular gap is formed between the bearing ring and the inner bearing member so that a sealing ring can be fitted which protects the rolling elements against contamination. This sealing ring can be formed as a simple lip seal.

In another arrangement, fastening holes to hold wheel spokes are provided in the flanges, so that the rolling bearing so formed is suitable for bicycles, motorcycles or similar vehicles equipped with spoked wheels.

BRIEF DESCRIPTION OF THE DRAWINGS

Certain preferred embodiments of the invention will now be described by way of example and with reference to the accompanying drawing, in which.

DESCRIPTION OF THE PREFERRED EMBODIMENTS

Figure 1:
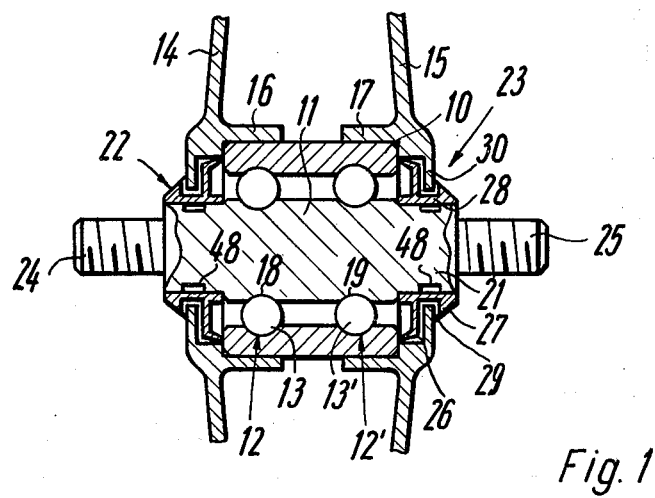
FIG. 1 shows a double-rowed rolling bearing in conjunction with a double-disc wheel, wherein a solid element having threaded pins projecting axially from both ends is provided on the inner bearing member.

The rolling bearing shown in FIG. 1 essentially comprises an outer bearing race 10 in the form of a ring, an inner bearing race 11 in the form of a cylinder, and two rows 12 and 12' of rolling elements 13 and 13' in the form of balls positioned between the races with the rows spaced from one another axially of the bearing. The rolling elements 13, 13' of this wide bearing are held spaced apart in each row by a separate cage (not shown) slipped in from the outside after the rolling elements occupy their correct positions between the races. Two wheel discs 14 and 15 of a double-disc wheel, whose peripheral portion is not shown in the drawing and which may for example include a pneumatic tyre, have respective axially inwardly directed flanges 16 and 17 which are pressed on to the outer bearing ring 10 and are thereby secured to the outer bearing ring. A direct mechanical connection between the two discs 14 and 15 in the region of their centres is therefore not necessary, so the wheel discs may be shaped very simply in order to accomplish their interconnection with the rolling bearing. The inner bearing race 11 is formed as a solid bearing pin which is provided with circumferential grooves 18 and 19 in which the rolling elements 13 and 13' are carried. Axially projecting portions 20 and 21 which are integral with the bearing pin 11 are provided at each of the bearing pin. These projecting portions 20 and 21 are of lesser diameter than the outer diameter of the bearing pin 11 and in length correspond to the axial dimension of seals 22 and 23 carried thereby. These bearing pin portions 20, 21 which project axially beyond the outer bearing ring 10 are continued axially further outwards as integral threaded pins 24 and 25. These threaded pins 24, 25 are screw-threaded fastening means by means of which the wheel can be secured in a wheel fork for example. It should be appreciated that the screw-threaded fastening means can take some alternative form appropriate to the particular form of securement which is required. Thus, it is possible to form the inner bearing race 11 as a stub axle with a threaded pin extending from only one end thereof and on which a securing nut is arranged to be screwed.

The seals 22 and 23 serve to protect the rolling bearing against contamination. The seal 23 comprises a base ring 28 fitted over the projecting portion 21 and having an inner sealing lip 26 adjacent to the rolling bearing and which rests sealingly against the end face of the outer bearing ring 10. An outer lip 27, likewise in the form of a radially outwardly projecting circumferential shoulder, forms together with the sealing lip 26 an annular labyrinth passage 29 into which projects a radially inwardly extending annular tongue 30 of the wheel disc hub. Preferably, the outer lip 27 rests sealingly against the annular tongue 30 of the wheel disc hub.

Figure 2:
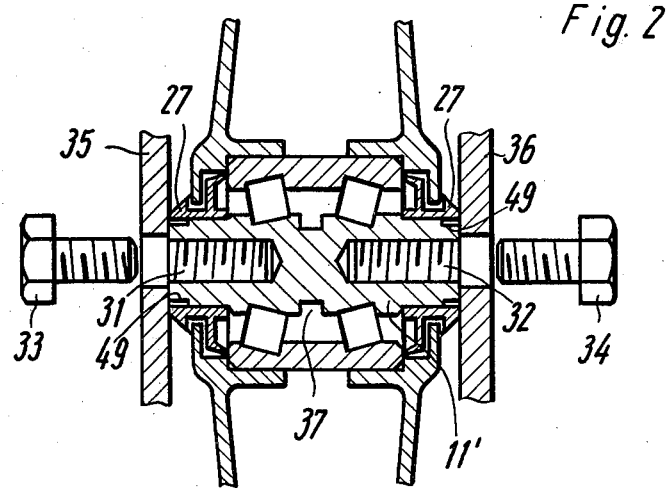
FIG. 2 shows a rolling bearing corresponding to FIG. 1 is a double-disc wheel, wherein however the rolling elements are formed so as to receive axial loads and the inner bearing member has a threaded bore at each end.

The rolling bearing shown in FIG. 2 incorporates cylindrical rolling elements which are inclined to the axis of the wheel so that the rolling bearing can take up greater axial loads. The inner bearing race 11' comprises a bearing pin with threaded bores 31, 32 extending axially inwardly at each end in which bearing pins 33, 34 may be screwed, these bearing pins 33, 34 passing through and supporting wheel fork legs 35 and 36. In order to reduce weight, the external diameter of the inner bearing race 11' may be reduced in the centre between the rows of rolling elements as indicated at 37.

Figure 3:
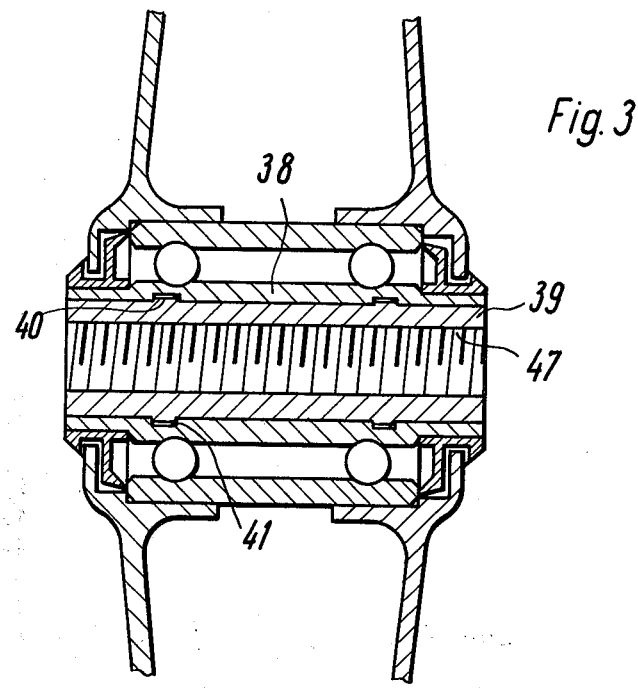
FIG. 3 shows a rolling bearing in which a bearing sleeve provided with a reducing bushing is provided as the inner bearing member.

The rolling bearing shown in FIG. 3 differs from the two rolling bearings described above in that in this third embodiment the inner bearing race is formed as a sleeve 38. This bearing sleeve 38 has at its ends sections of reduced external diameter which project axially outwardly beyond the outer bearing ring and which provide seating surfaces for seals for the bearing. A reducing sleeve 39 with an internal screw thread in which bearing pins, for example as shown in FIG. 2, can be screwed is fitted inside the bearing sleeve 38. The reducing sleeve 39 is pressed into the surrounding bearing sleeve 38. In order to prevent any axial displacement between the two parts they may be connected to one another by means of a snap connection for example. Thus, the reducing sleeve 39 has a pair of circumferential lugs 40 with sloping side walls, while the bearing sleeve 38 is provided with a corresponding pair of internal annular grooves 41 into which the peripheral lugs 40 will snap when the two parts 38 and 39 are pressed together. The reducing sleeve 39 may be formed for example of a plastics material or of aluminium in order to reduce the total weight of the rolling bearing as much as possible.

Figure 4:
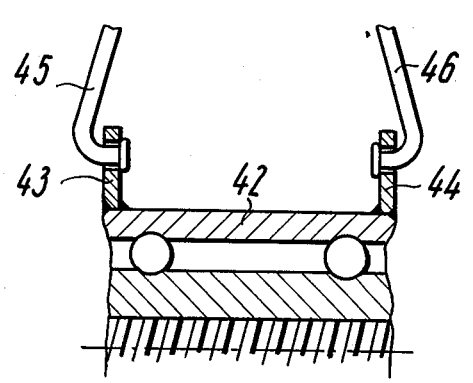
FIG. 4 is a schematic illustration of a rolling bearing as in FIG. 1, 2 or 3, with a special means of securement of wheel spokes to the outer bearing ring.

FIG. 4 illustrates a different construction of the outer bearing ring 42 suitable for a bicycle wheel hub. Annular flanges 43 and 44 are provided at each end of the outer bearing ring 42 and the spokes 45, 46 of the wheel fit into these flanges. The annular flanges 43, 44 may be welded on to the outer bearing ring 42 if this ring has not been hardened to bear the rolling elements and if the outer surface layer has been roughened. It will be appreciated that the conventional cone ball-bearing with its relatively complicated construction has in this way been simplified. This applies also to cone ball-bearings heretofore used on other wheels or rollers.

With all rolling bearings it is common practice to manufacture them as finished components and then to store them. It is not necessary that the individual parts must in the first instance be connected to the object to be supported, for example a wheel for a vehicle or other object. This simplifies any necessary replacement of a rolling bearing in a wheel which is already in use. Now, conventional roller bearings in which relatively long rollers extend over the whole width of the wheel hub can be replaced by the rolling bearings of the invention described above. This is clearly advantageous since the production of these long rollers is expensive because of the multiple polishing and hardening steps which are involved. Moreover, cone ball-bearings can be replaced by the rolling bearings of the present invention, the latter being simple in structure and thus competitive in price. The bearings of the present invention also avoids problems associated with the fitting together of a large number of component parts.

In the embodiments shown in FIGS. 1 and 2 circumferential grooves 48 and 49 are provided in the radially outwardly facing cylindrical surfaces of the axially projecting portions 20, 21 which carry the seals 22, 23. These grooves 48, 49 simplify and make possible the fitting of the wheel discs 14, 15 which in the assembly of a double-disc wheel are connected to one another by pushing them together axially and over the outer bearing ring 10. In this procedure the radially inwardly projecting annular tongue 30 must be pressed over the seal lips 27. The grooves 48, 49 thus receive the portions of the seals 22, 23 which are thereby deformed by the rigid discs 14, 15. Thus, in the embodiment of FIG. 1, the seal forming the bottom of the annular passage 29 which lies between the seal lips 26 and 27 yields into the groove 48 so that the annular tongue 30 can snap over the lip 27. In FIG. 2, the lip 27 is forced down into the groove 49 as the tongue 30 is pushed over it.

Figure 5:
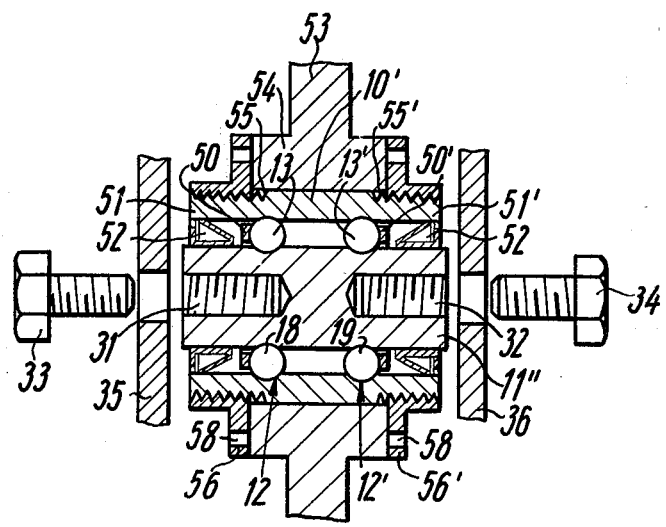
FIG. 5 shows a double-rowed rolling bearing in conjunction with a single-disc wheel, wherein to the right and to the left of the rolling bearing are illustrated a part of a wheel fork and a pin for connection to the inner bearing member.

The rolling bearing which is shown in FIG. 5 shows how the rolling elements of the wheel bearing which are here formed as balls are held spaced apart in two rows by cages 50, 50' which are inserted from the outside after the rolling elements have been set in position.

The construction of the inner bearing member 11'' corresponds, in respect of the securement of the partially shown wheel forks 35, 36 to the embodiment shown in FIG. 2.

The outer bearing ring 10' is in this embodiment extended axially in both axial directions beyond the rows 12, 12' of rolling elements of the bearing. Seals in the form of sealing rings 52, 52' are provided between the extended portions 51, 51' of the outer ring and the peripheral surface of the inner bearing 11'' which faces the outer bearing ring. These sealing rings 52, 52' which may be formed for example as lip seals protect the interior of the rolling bearing against contamination by dust, flakes of powder and the like, and also have the effect that no lubricating means can escape from the interior of the rolling bearing and thereby becomes a contamination hazard to a person using or working with the wheel.

A wheel comprising a radial disc 53 terminating in a hub 54 which is secured to the rolling bearing is arranged to be fitted around the circumference of the outer bearing ring 10'. The fitting is effected by flanges 56, 56' which are screwed on to the ends of the bearing ring 10' on each side of the hub 54 and which hold the axial faces of the hub 54 clamped between them.

Figure 6:
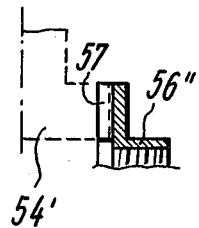
FIG. 6 shows a modified form of flange which is positively engageable with the hub or with the wheel disc.

The assembly of the flanges 56 and 56' is effected so that initially the flanges 56 for example, which has an internal screw thread, is screwed on to the external screw thread 55 of the outer bearing ring 10'. Then, the bearing ring 10' or the whole rolling bearing with its as yet flange-less end 51' is inserted into the bore in the wheel hub 54 and finally is secured by screwing on the second flange 56'. This method of fitting is applicable not only with wheels or wheel discs of this type which are of metal, but can also be used with wheels of a plastics material, particularly if made as one-piece wheels. In this latter case, the wheel hub is correspondingly bored out or widened and then the flanges can be secured rigidly to the wheel rolling bearing by merely dropping in the bearing and clamping the hub or the wheel disc by drawing the flanges together. Particularly with wheels of a plastics material, the clamping can be so arranged that a press-fitting of the hub on to the bearing ring, which is usual with conventional fittings, can be avoided. A suitable means of securement is however also possible if the flanges are keyed to the bearing ring 10' and to the hub 54 or the wheel disc 53, or if they are connected by turning in the edges of the flanges. In this connection, FIG. 6 shows a flange ring 56'' which has at least one keying rib 57 extending radially of the axis of rotation of the bearing and which is arranged to come into positive engagement with a corresponding groove in the hub 54' and thus prevent any relative rotation between the wheel and the outer bearing ring of the rolling bearing.

The flanges 56, 56' shown in FIG. 5 are provided with holes 58 to receive the ends of wheel spokes.

I claim:

1. A journal bearing comprising an inner bearing member defining a pair of axially spaced inner bearing races, a tubular outer bearing ring encircling said inner bearing member and arranged to provide central support for a wheel or the like, said outer bearing ring being formed with outer bearing races juxtaposed with said inner bearing races, at least two rows of rolling elements between said bearing member and bearing ring with the rows spaced from one another axially of the bearing ring, each of said rows being received in an inner bearing race and an outer bearing race juxtaposed therewith, the inner bearing member axially extending beyond the respective inner bearing races in opposite directions respective annular seals mounted upon each end of said inner bearing member and engaging said ring for protecting the rolling elements against contamination, and respective threaded elements carried on axial end portions of the inner bearing member for retaining said seals thereon.

2. A journal bearing according to claim 1, in which the inner bearing member is a solid member with threaded pins projecting from each axial end thereof to receive said said threaded elements.

3. A journal bearing according to claim 1, in which the inner bearing member is a solid member with a threaded bore provided in each end thereof.

4. A journal bearing according to claim 1, in which the inner bearing member is a bearing sleeve, and a reducing sleeve with an internal threaded is secured in the bearing sleeve.

5. A journal bearing according to claim 4, in which the reducing sleeve is secured against axial displacement relative to the bearing sleeve by radially projecting means therebetween.

6. A journal bearing according to claim 1, in which the axial end portions of the inner bearing member carrying the seal are of reduced external diameter and project axially beyond the outer bearing ring.

7. A journal bearing according to claim 1, in which each seal defines a labyrinth annular passage arranged to receive a radially inwardly projecting annular tongue of a wheel hub portion, and includes a sealing lip arranged to rest sealingly against the outer bearing ring and forming the inner limit of the labyrinth passage.

8. A journal bearing according to claim 7, in which each seal includes an axially outer annular portion formed as a lip arranged to rest sealingly against said annular tongue of the wheel hub portion.

9. A journal bearing according to claim 8, in which the axial end portions of the inner bearing member carrying the seal are of reduced diameter in the region of the lip arranged sealingly to engage against the wheel hub portion.

10. A journal bearing according to claim 1, which includes hub flanges of wheel discs of a double-disc wheel secured to the outer bearing ring by press-fitting.

11. A journal bearing according to claim 1, which includes flange means apertured to receive the spokes of a spoked wheel and welded to the outer bearing ring.

12. A journal bearing according to claim 1, in which the outer bearing ring carries two flanges to which a wheel hub or a wheel disc is rigidly connected.

13. A journal bearing according to claim 12, in which at least one flange is screwed on to the outer bearing ring and the wheel hub or wheel disc is clamped rigidly between the two flanges.

14. A journal bearing according to claim 12, in which at least one flange is connected to the wheel hub or wheel disc in a manner preventing relative rotation therebetween.

15. A journal bearing according to claim 14, in which said at least one flange has radial ribs which engage in corresponding grooves in the wheel hub or wheel disc.

16. A journal bearing according to claim 12, in which the outer bearing ring extends in the axial direction at each end beyond the rolling elements and carries on the extension portions fastening means for the flanges.

17. A journal bearing according to claim 16, in which a sealing ring is provided within each extension portion of the outer bearing ring.

18. A journal bearing according to claim 12, in which fastening holes to hold wheel spokes are provided in said flanges.

* * * * *